United States Patent
Barrowman

(10) Patent No.: US 10,753,581 B2
(45) Date of Patent: Aug. 25, 2020

(54) DEVICES AND METHODS FOR OPTICAL-BASED TAMPER DETECTION USING VARIABLE LIGHT CHARACTERISTICS

(71) Applicant: VeriFone, Inc., San Jose, CA (US)

(72) Inventor: John Henry Barrowman, Knoxville, TN (US)

(73) Assignee: VeriFone, Inc., San Jose, CA (US)

( * ) Notice: Subject to any disclaimer, the term of this patent is extended or adjusted under 35 U.S.C. 154(b) by 0 days.

(21) Appl. No.: 16/731,276

(22) Filed: Dec. 31, 2019

(65) Prior Publication Data

US 2020/0149710 A1    May 14, 2020

Related U.S. Application Data

(63) Continuation of application No. 16/181,765, filed on Nov. 6, 2018, now Pat. No. 10,544,923.

(51) Int. Cl.
| | | |
|---|---|---|
| *F21V 15/00* | (2015.01) | |
| *H05B 47/105* | (2020.01) | |
| *F21V 7/28* | (2018.01) | |

(52) U.S. Cl.
CPC .............. *F21V 15/005* (2013.01); *F21V 7/28* (2018.02); *H05B 47/105* (2020.01)

(58) Field of Classification Search
None
See application file for complete search history.

(56) References Cited

U.S. PATENT DOCUMENTS

| | | | | |
|---|---|---|---|---|
| 2007/0152816 A1* | 7/2007 | Koste | ................... | G01V 8/16 340/545.3 |
| 2008/0083868 A1* | 4/2008 | Wipiejewski | .......... | G08B 13/19 250/221 |
| 2009/0127336 A1* | 5/2009 | Mirkazemi-Moud | .... | G07G 1/12 235/449 |

* cited by examiner

*Primary Examiner* — Jany Richardson
(74) *Attorney, Agent, or Firm* — Greenberg Traurig LLP

(57) ABSTRACT

Devices and methods for optical-based tamper detection using variable light characteristics are disclosed. In one embodiment, an electronic device may include a housing, a light source within the housing configured to emit light having an output light characteristic that is variable, a light detector within the housing configured to receive the light emitted by the light source, the light received by the light detector having a received light characteristic, and an optoelectric controller in communication with the light source and the light detector, wherein the optoelectric controller controls the output light characteristic, and compares the received light characteristic to a known received light characteristic.

20 Claims, 2 Drawing Sheets

DEVICES AND METHODS FOR OPTICAL-BASED TAMPER DETECTION USING VARIABLE LIGHT CHARACTERISTICS

RELATED APPLICATIONS

This application is a Continuation of U.S. patent application Ser. No. 16/181,765, filed Nov. 6, 2018, now U.S. Pat. No. 10,544,923, the disclosure of which is hereby incorporated by reference in its entirety.

BACKGROUND OF THE INVENTION

1. Field of the Invention

The present disclosure relates generally to devices and methods for optical-based tamper detection using variable light characteristics.

2. Description of the Related Art

Unscrupulous parties often target card-reading devices, such as point of sale devices, to capture card numbers, personal identification numbers (PINs), and other card data. Because of this, these devices often include mechanisms for detecting attempts to compromise their security, and when a breach is detected, often take actions to maintain the security of any information that may be stored on the device and/or prevent normal operation.

SUMMARY OF THE INVENTION

Devices and methods for optical-based tamper detection using variable light characteristics are disclosed. In one embodiment, an electronic device may include a housing, a light source within the housing configured to emit light having an output light characteristic that is variable, a light detector within the housing configured to receive the light emitted by the light source, the light received by the light detector having a received light characteristic, and an optoelectric controller in communication with the light source and the light detector, wherein the optoelectric controller controls the output light characteristic, and compares the received light characteristic to a known received light characteristic.

In one embodiment, the output light characteristic may vary in intensity, duty cycle, in wavelength, in state, etc. The output light characteristic may vary randomly or pseudo-randomly.

In one embodiment, the optoelectric controller may cause execution of a security action in response to the received light characteristic and the known received light characteristic differing by a predetermined amount. The security action may include erasing secure information from a memory.

In one embodiment, the device may include a plurality of components within the housing. Some of the components may be covered with a reflective coating.

In one embodiment, the light source and/or the light detector may be positioned to detect a breach of the housing.

In one embodiment, the known received light characteristic may be based on the output light characteristic.

In one embodiment, the electronic device may be a point of sale device.

According to another embodiment, in an electronic device comprising a housing, a light source in the housing, a light detector in the housing, and an optoelectric controller, a method for optical-based tamper detection using variable light characteristics may include: (1) the light source emitting light having an output light characteristic that is variable, wherein the optoelectric controller controls the output light characteristic; (2) the light detector receiving the light emitted by the light source, the light received by the light detector having a received light characteristic; (3) the optoelectric controller comparing the received light characteristic to a known received light characteristic; and (4) the optoelectric controller causing execution of a security action in response to the received light characteristic and the known received light characteristic differing by a predetermined amount.

In one embodiment, the output light characteristic may vary in intensity, duty cycle, in wavelength, in state, etc. The output light characteristic may vary randomly or pseudo-randomly.

In one embodiment, the security action may include erasing secure information from a memory.

In one embodiment, the light source and/or the light detector may be positioned to detect a breach of the housing.

In one embodiment, the known received light characteristic may be based on the output light characteristic.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to devices and methods for optical-based tamper detection by measuring the light from light source that is received at a light detector, in particular measuring an output light characteristic that may be varied. In one embodiment, the output light characteristic may vary by one or more of wavelength, intensity, duty cycle, and state.

For example, the wavelength of the light source may vary in any of the visible spectrum, infrared spectrum, ultraviolet spectrum, etc. The wavelength of the light source may vary by changing the wavelength of the light source from one measurement to another. In one embodiment, during a single measurement, the wavelength of the light source may be varied over time.

The intensity of the light from one or more light sources may vary to create any color at any measurable intensity.

The duty cycle (e.g., on and off times) of the light source may be fixed, variable, random, pseudo-random, etc. The duty cycle may be manipulated to control intensity, to modulate the light source, etc.

The state (or stability) of the light source may vary as a function of time. For example, a light source may start at an intensity of 50%, and ramp up to 100% over a period of 250 msec. The optoelectric controller would expect to measure a comparable change in the intensity of the light received at the receiver or light detector. If the intensity of the light received at the receiver or light detector in a different fashion, or light is not received at all, a tamper event may be detected, and a security action may be taken. Similarly, if the wavelength or duty cycle of the light received at the receiver or detector is different from that of the light source, then a tamper event may be detected, and a security action may be taken.

Figure 1:
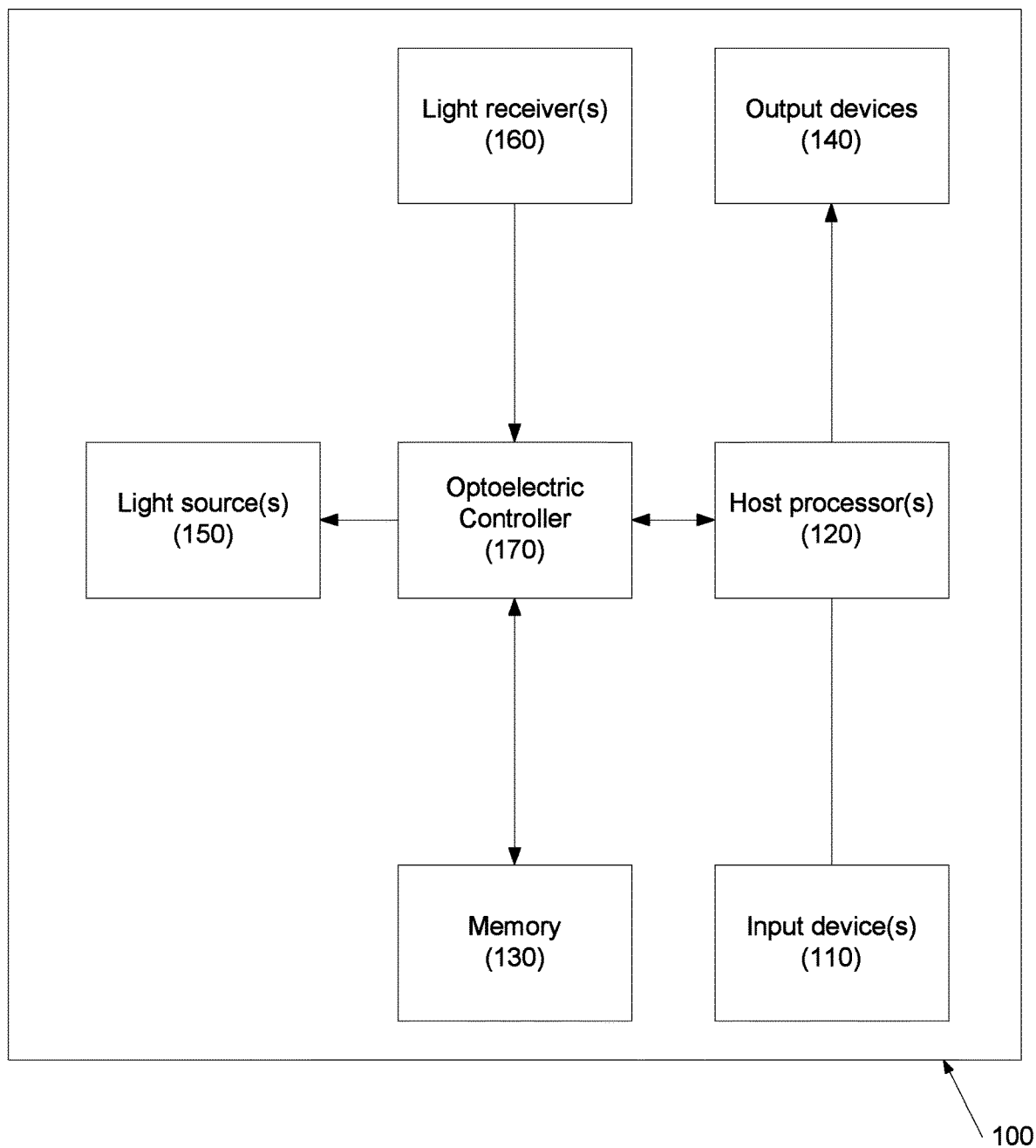
FIG. 1 depicts a system for optical-based tamper detection using variable light characteristics according to one embodiment.
Figure 2:
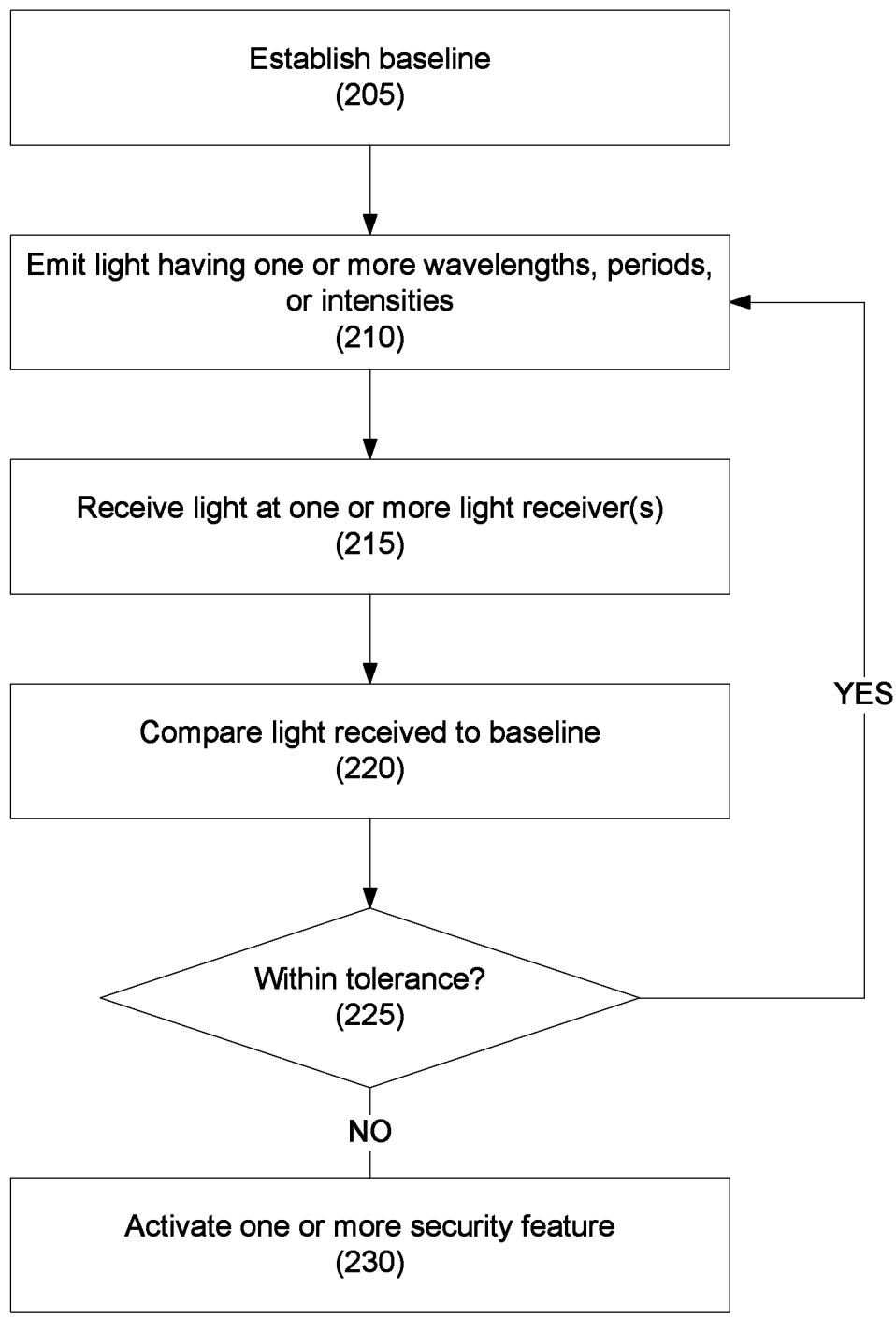
FIG. 2 depicts a method for optical-based tamper detection using variable light characteristics according to one embodiment.

Several embodiments of the present invention and their advantages may be understood by referring to FIGS. 1-2.

Referring to FIG. 1, in one embodiment, the device may include housing 100, which may include, for example, one or more input device 110 (e.g., keypads, touchscreens, magnetic stripe readers, EMV chip readers, RF receivers, NFC receivers, etc.), one or more host computer processor 120 (e.g., secure processors, unsecure processors, etc.), memory 130, display 140, one or more light source 150, one or more light receiver 160, and one or more optoelectric controllers 170. Housing 100 may include additional elements (e.g., circuit boards, integrated circuit chips, etc.) or fewer elements as is necessary and/or desired.

In one embodiment, host processor 120 and optoelectric controller 170 may be the same processor or controller.

In one embodiment, housing 100 may comprise multiple parts (e.g., a top part and a bottom part) that may be mechanically coupled (e.g., by fasteners, screws, clips, adhesives, welding, etc.). In one embodiment, housing 100 may be provided with one or more tamper detection devices (not shown), such as case open switches, security meshes, etc.

Although embodiments may be described in the context of a point of sale device, it should be recognized that the disclosure is not so limited. Embodiments have applicability in any device having a closed or semi-closed housing in which tamper detection is desired.

In one embodiment, light source(s) 150 and light receiver (s) 160 may be positioned within housing 100 so that light emitted from light source(s) 150 may be received by light receiver(s) 160 directly and/or indirectly (e.g., reflected off of the interior housing 110, electrical and mechanical components provided therein, etc.). Light receiver(s) 160 may further be positioned to detect light from a light source (not shown) that is external to housing 100, such as ambient light, a light source seeking to mimic light from light source(s) 150, etc.

In one embodiment, light source(s) 150 and/or light receiver(s) 160 may be positioned near certain elements (e.g., optoelectric controller 170, host processor 120, memory 130, input device(s) 110, etc.) in order to detect a tamper event near these elements. Thus, embodiments provide a "self-protection" feature in which light source(s) 150, light receiver(s) 160, and/or optoelectric controller 170 may be located within an area of housing 100 that is being monitored. For example, if an attack seeks to disable the optoelectric tamper detection, the attack would be detected by the optoelectric tamper detection system. Similarly, if an attack sought to access a data interface between optoelectric controller 170 and host processor 120, that attack would also be detected by the optoelectric tamper detection system.

In one embodiment, light source(s) 150 may include a single light source (e.g., a LED or a LED cluster), a multiple light source (e.g., two or more LEDs or LED clusters located within housing 100), etc. The light source(s) 150 may be selected to produce a single wavelength, or a complex wavelength, and the intensity of the wavelength(s) produced may vary (e.g., between 10% and 100%, or as otherwise desired).

In one embodiment, light receiver 160 may include single light sensor with or without a filter, or multiple light sensors with or without filters.

In one embodiment, light receiver(s) 160 may be photocells (e.g., Cadmium-Sulfoselenide (CdS) photocells). For example, a change in the resistance of a photocell may be used to identify a change in light intensity. If the change in intensity varies outside of an expected amount, a tamper event may be detected.

In one embodiment, light receiver(s) 160 may be color detection or sensor modules.

In one embodiment, light source(s) 150 may provide light having a plurality of wavelengths (e.g., white light), or of a single wavelength (e.g., red, green, blue, infrared). Light source(s) 150 may be capable of producing light having different wavelengths at different times (e.g., red, blue, green, etc.). In another embodiment, ultraviolet (UV) light emitters and detectors may be used.

In another embodiment, light source(s) 150 may provide light having a plurality of wavelengths, and may be provided with a filter (not shown), such as a red filter, a blue filter, a green filter, etc. that results in light of a single wavelength. In one embodiment, the filter may be a gel-type filter.

In one embodiment, a plurality light sources 150 and filters may be provided to provide light of different wavelengths.

In one embodiment, light source(s) 150 may be LED light source(s), and may vary the intensity of emitted light.

In one embodiment, portions of the interior of housing 100 and/or the surface(s) of any components (e.g., mechanical and/or electrical components) contained therein may be provided with a coating (e.g., a reflective coating, a non-reflective coating, etc.) or cover (e.g., a reflective or non-reflective sheet of material) as is necessary and/or desired. For example, some or all of the interior of housing 100 may be painted with a coating to enhance its reflectiveness. Some or all components within housing 100 may be coated as is necessary and/or desired.

In one embodiment, optoelectric controller 170 may control at least one output light characteristic of the light source(s) 150, such as the wavelength, intensity, duty cycle, and state of emitted light, and may further receive and process signal(s) from light receiver(s) 160. Optoelectric controller 170 may activate light source(s) so as to produce a wavelength (e.g., if multiple light sources 150 each emitting (or filtered to emit) a particular wavelength are used, activating each light source 150 one at a time; if one light source 150 can emit multiple wavelengths, activating that light source 150 to emit light having a particular wavelength, and then light having a different wavelength).

In one embodiment, optoelectric controller 170 may cause light having different wavelengths to be emitted simultaneously. For example, optoelectric controller 170 may cause red light and green light to be emitted at the same time. The red and green light may be emitted from a single light source capable of generating multiple light wavelengths at the same time, or from separate light sources that may each generate one of the desired light wavelengths at a time.

Optoelectric controller 170 may control the wavelength of the light emitted by light source(s) 150 and, if necessary, filters, in a random or pseudo-random manner. By using a random or pseudo-random pattern, the pattern of light wavelengths that are emitted by the internal light sources may not readily be predicted or emulated by someone trying to circumvent this security feature.

For example, the series of wavelengths, the series of durations of illumination, the series of interstitial delay between illuminations, the intensity of the wavelengths, etc. may be random or pseudorandom.

In one embodiment, optoelectric controller 170 may control the intensity of the light emitted by light source(s) 150 in a random or pseudo-random manner so that a pattern of light intensity may not be readily predicted or emulated by someone trying to circumvent this security feature.

In one embodiment, light receiver(s) 160 may receive light emitted from light source(s) 150, and may indicate or determine one or more received light characteristics (e.g., wavelength, intensity, duty cycle, and state) of the received light. In one embodiment, if the one or more received light characteristics differs from a known received light characteristic, such a baseline light characteristic measured in a secure environment or configuration, a tamper event may be detected. Examples of events that may cause the received light to not be within the predetermined tolerance level include the opening or breach of the housing, damage to the housing, the introduction of a foreign light source into the housing (e.g., in an attempt to defeat a light-based optical tamper detection mechanism), the movement or removal of a component within the housing (with or without a reflective coating), etc. If a tamper event is detected, optoelectric controller 170 and/host computer processor 120 may implement one or more security actions (e.g., sound an alarm, power down, erase security-sensitive information in memory 130, terminate network connections, etc.). For example, if a light wavelength other than the wavelength of light emitted from the light source is detected by the light receiver, the receiver may respond with a different-than-expected resistance. This different-than-expected resistance will result in a voltage signal that is not within the expected range, which may indicate a tamper event.

Similarly, if the intensity of the light received at the light detector differs from a known intensity, this difference may indicate a tamper event. The light detected by the light detector may be reflected off of a particular object within the device, including those that may or may not have been coated with a reflective material, or the light may be detected directly from the light source.

Referring to FIG. 2, a method for optical-based tamper detection using variable light characteristics according to one embodiment.

In step 205, when the device is in a known secure configuration, a baseline for wavelength, intensity, duty cycle, and/or state may be established. For example, a processor for the device may cause light of a certain wavelength, intensity, duty cycle, and/or state to be emitted by the light source, and may measure the wavelength, intensity, duty cycle, and/or state of light received at each of the one or more light receivers caused by the reflection of the light source off of objects within the interior of the housing. This information may then be stored in non-volatile memory. The processor may repeat this for each wavelength, intensity, duty cycle, and/or state and may store the information for each wavelength, intensity, duty cycle, and/or state. This process may cause multiple measurements to be performed and may average the results to establish a baseline.

For example, in one embodiment, if a system employed four light sensors and two light sources, a set of measurements may consist of eight readings. That is, each sensor would be read twice (e.g., once when the first light source is on, and second time when the second source is on). In one embodiment, the readings may be repeated several times (e.g., ten times) and then averaged which would provide an average value for each sensor/source combination.

In one embodiment, the processor may do this for each light source, for each wavelength, intensity, duty cycle, each state, etc. For example, the processor may activate both the red and green light sources, and may record the results of the light received at the light detector.

In one embodiment, the baseline may be established at manufacture after the device has been fully assembled, when it has been repaired, or at any other suitable time. For example, the baseline may be established in a secure environment.

After the baseline is established, in step 210, the processor may activate one or more light sources having one or more wavelength, intensity, duty cycle, and/or state. The timing with which the processor activates the light source may be periodic, pseudo-periodic, or random. In one embodiment, the processor may activate the one or more light sources using a pattern, in a pseudo-random manner, or in a random manner such that the wavelengths of the light emitted vary over time.

In one embodiment, the light source(s) may be activated for a short period of time. For example, the light sources may be activated for between 60-250 milliseconds. Other activation lengths may be used as is necessary and/or desired. The timing of the activation may also be based on a known pattern or sequence, or the timing may be based on a pseudo-random or random sequence.

In step 215, light may be received at one or more light receivers within the device. In one embodiment, the light receiver may detect one or more wavelength, intensity, duty cycle, and/or state of the light.

In step 220, the wavelength, intensity, duty cycle, and/or state of the light received at one or more of the light receivers may be compared to the baseline, or to the sequence or pattern of wavelengths, intensities, duty cycles, and/or states emitted.

In step 225, if the light received at one or more light receiver(s) is within a predetermined tolerance level, the process of emitting, detecting, and comparing may be repeated.

If, in step 225, the received light is not within a predetermined tolerance level, in step 230, one or more security feature (e.g., sound an alarm, power down, erase memory, delete secret payment keys, terminate network connections, alert a host management (or similar) system, etc.) may be activated. Examples of events that may cause the received light to not be within the predetermined tolerance level include opening or breaching the housing, damage to the housing, the introduction of a foreign light source into the housing (e.g., in an attempt to defeat a light-based optical tamper detection mechanism), and the movement or removal of a component within the housing (with or without a reflective coating).

The following documents are hereby incorporated, by reference, in their entirety: U.S. patent application Ser. No. 15/900,317; U.S. patent application Ser. No. 14/802,305; and U.S. Provisional Patent Application Ser. No. 62/027,890.

It will be appreciated by persons skilled in the art that the present invention is not limited by what has been particularly shown and described hereinabove. Rather the scope of the present invention includes both combinations and sub-combinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for optical-based tamper detection using variable light characteristics comprising:
in an electronic device comprising a housing, a light source in the housing, a light detector in the housing, and an optoelectric controller:
at a first time:
the light source emitting light having a first output state;
the light detector receiving the light emitted by the light source, the light received by the light detector having a first received state; and
at a second time:
the light source emitting light having a second output state; and
the light detector receiving the light emitted by the light source, the light received by the light detector having a second received state; and
the optoelectric controller causing execution of a security action in response to a difference between the first received state and the second received state that is unrelated to the first output state and the second output state.

2. The method of claim 1, wherein the first output state comprises a first wavelength, and the second output state comprises a second wavelength, wherein the first wavelength is different from the second wavelength.

3. The method of claim 1, wherein the first output state comprises a first duty cycle, and the second output state comprises a second duty cycle, wherein the first duty cycle is different from the second duty cycle.

4. The method of claim 1, wherein the first output state comprises a first intensity, and the second output state comprises a second intensity, wherein the first intensity is different from the second intensity.

5. The method of claim 1, wherein the optoelectric controller controls when the light source emits light having the first output state and when the light source emits light having the second output state.

6. The method of claim 1, wherein the first received state is a baseline state.

7. The method of claim 1, wherein the difference between the first received state and the second received state is unrelated to the first output state and the second output state when the difference is not within a tolerance level.

8. The method of claim 1, wherein the security action comprises at least one of erasing secure information from a memory, sounding an alarm, and powering off the electronic device.

9. The method of claim 1, wherein the second output state is selected randomly.

10. The method of claim 1, wherein the light source comprises a first light source and a second light source, and the step of the light source emitting light having the first output state comprises:
the first light source emitting light having a first first output state; and
the second light source emitting light having a second first output state; and
wherein the step of the light source emitting light having the second output state comprises:
the first light source emitting light having a first second output state; and
the second light source emitting light having a second second output state;
wherein at least one of the first first output state and the second first output states, and the first second output state and the second second output states are different.

11. A method for optical-based tamper detection using variable light characteristics comprising:
in an electronic device comprising a housing, a light source in the housing, a light detector in the housing, and an optoelectric controller:
at a first time, the light source emitting light having a first output state;
the light detector receiving the light emitted by the light source;
after a first delay and at a second time, the light source emitting light having a second output state;
the light detector receiving the light emitted by the light source, the light received by the light detector received after a second delay;
the optoelectric controller causing execution of a security action in response to the first delay being unrelated to the second delay.

12. The method of claim 11, wherein the security action comprises at least one of erasing secure information from a memory, sounding an alarm, and powering off the electronic device.

13. The method of claim 11, wherein the first delay is selected randomly.

14. An electronic device with optical-based tamper detection, comprising:
a housing;
a light source in the housing, the light source having a first output state and a second output state; and
an optoelectric controller that controls when the light source emits light having the first output state and when the light source emits light having the second output state;
wherein, at a first time:
the light source emits light having the first output state;
the light detector receives the light emitted by the light source, the light received by the light detector having a first received state; and
wherein, at a second time:
the light source emits light having the second output state;
the light detector receives the light emitted by the light source, the light received by the light detector having a second received state; and
the optoelectric controller causes execution of a security action in response to a difference between first received state and the second received state that is unrelated to the first output state and the second output state.

15. The device of claim 14, wherein the difference between the first received state and the second received state is unrelated to the first output state and the second output state when the difference is not within a tolerance level.

16. The device of claim 14, wherein the light source comprises a first light source and a second light source, and the step of the light source emitting light having the first output state comprises:
the first light source emitting light having a first first output state; and
the second light source emitting light having a second first output state; and
wherein the step of the light source emitting light having the second output state comprises:
the first light source emitting light having a first second output state; and
the second light source emitting light having a second second output state;
wherein at least one of the first first output state and the second first output states, and the first second output state and the second second output states are different.

17. The device of claim 14, wherein the first output state comprises a first wavelength, and the second output state comprises a second wavelength, wherein the first wavelength is different from the second wavelength.

18. The device of claim 14, wherein the first output state comprises a first duty cycle, and the second output state comprises a second duty cycle, wherein the first duty cycle is different from the second duty cycle.

19. The device of claim 14, wherein the first output state comprises a first intensity, and the second output state comprises a second intensity, wherein the first intensity is different from the second intensity.

20. The device of claim 14, wherein the security action comprises at least one of erasing secure information from a memory, sounding an alarm, and powering off the electronic device.

* * * * *